United States Patent
Moon et al.

(10) Patent No.: US 11,379,737 B2
(45) Date of Patent: Jul. 5, 2022

(54) METHOD AND APPARATUS FOR CORRECTING MISSING VALUE IN DATA

(71) Applicant: SAMSUNG SDS Co., Ltd., Seoul (KR)

(72) Inventors: Ki Hyo Moon, Seoul (KR); Hyun Bin Loh, Seoul (KR); Sung Jun Kim, Seoul (KR); Jin Hwan Han, Seoul (KR); Ji Su Jeong, Seoul (KR)

(73) Assignee: SAMSUNG SDS Co., Ltd., Seoul (KR)

( * ) Notice: Subject to any disclaimer, the term of this patent is extended or adjusted under 35 U.S.C. 154(b) by 550 days.

(21) Appl. No.: 16/568,369

(22) Filed: Sep. 12, 2019

(65) Prior Publication Data

US 2020/0082283 A1 Mar. 12, 2020

(30) Foreign Application Priority Data

Sep. 12, 2018 (KR) .................. 10-2018-0109019

(51) Int. Cl.
*G06F 21/00* (2013.01)
*G06N 5/04* (2006.01)
*G06N 20/00* (2019.01)
*G06F 16/23* (2019.01)

(52) U.S. Cl.
CPC ........ *G06N 5/04* (2013.01); *G06F 16/2365* (2019.01); *G06N 20/00* (2019.01)

(58) Field of Classification Search
CPC .......... G06N 5/04; G06N 20/00; G06N 20/20; G06F 16/2365; G06F 16/31
See application file for complete search history.

(56) References Cited

U.S. PATENT DOCUMENTS

| | | | | |
|---|---|---|---|---|
| 8,140,421 B1 * | 3/2012 | Humphries | ........... | G06Q 20/105 |
| | | | | 705/40 |
| 9,785,983 B2 * | 10/2017 | Zhao | ....................... | G06Q 30/04 |
| 2016/0078367 A1 * | 3/2016 | Adjaoute | ............... | G06N 20/00 |
| | | | | 706/12 |
| 2017/0235848 A1 * | 8/2017 | Van Dusen | ............ | G06N 20/00 |
| | | | | 705/12 |
| 2018/0053255 A1 * | 2/2018 | Valdyanathan | ...... | G06Q 10/067 |
| 2019/0301963 A1 * | 10/2019 | Yoshikawa | ............. | G06F 17/18 |
| 2019/0340533 A1 * | 11/2019 | Copper | .................. | G06N 3/084 |
| 2020/0082283 A1 * | 3/2020 | Moon | .................... | G06N 20/00 |
| 2022/0138741 A1 * | 5/2022 | Alt | ..................... | G06Q 20/3827 |
| | | | | 705/71 |

* cited by examiner

*Primary Examiner* — Mahfuzur Rahman

(74) *Attorney, Agent, or Firm* — The PL Law Group, PLLC

(57) ABSTRACT

A method and apparatus for correcting missing values in data are provided. A method of correcting missing values in basic data according to an embodiment includes a data extraction step, a prediction model configuration step, a first correction step, and a second correction step. The method corrects missing values in data by repeating the steps of generating a prediction model for correcting the missing value and correcting the missing value with the use of the prediction model.

14 Claims, 15 Drawing Sheets

FIG. 5

| No | sepal_length | sepal_width | petal_length | petal_width | species |
|----|--------------|-------------|--------------|-------------|---------|
| 0 | 5.1 | 3.5 | 1.4 | 0.2 | setosa |
| 1 | 4.9 | 3 | 1.4 | NaN | setosa |
| 2 | NaN | 3.2 | 1.3 | 0.2 | setosa |
| 3 | 4.6 | 3.1 | 1.5 | 0.2 | setosa |
| 4 | 5 | 3.6 | 1.4 | 0.2 | setosa |
| 5 | NaN | 3.9 | NaN | 0.4 | setosa |
| 6 | 4.6 | 3.4 | 1.4 | 0.3 | setosa |
| 7 | 5 | 3.4 | 1.5 | 0.2 | null |
| ⋮ | ⋮ | ⋮ | ⋮ | ⋮ | ⋮ |

FIG. 8

| No | sepal_length | sepal_width | petal_length | petal_width | species |
|----|--------------|-------------|--------------|-------------|---------|
| 0 | 5.1 | 3.5 | 1.4 | 0.2 | setosa |
| 1 | 4.9 | 3 | 1.4 | 0.2 | setosa |
| 2 | 4.6 | 3.2 | 1.3 | 0.2 | setosa |
| 3 | 4.6 | 3.1 | 1.5 | 0.2 | setosa |
| 4 | 5 | 3.6 | 1.4 | 0.2 | setosa |
| 5 | 5.4 | 3.9 | 1.8 | 0.4 | setosa |
| 6 | 4.6 | 3.4 | 1.4 | 0.3 | setosa |
| 7 | 5 | 3.4 | 1.5 | 0.2 | setosa |
| ⋮ | ⋮ | ⋮ | ⋮ | ⋮ | ⋮ |

| No | sepal_length | sepal_width | petal_length | petal_width | species |
|---|---|---|---|---|---|
| 0 | 5.1 | 3.5 | 1.4 | 0.2 | setosa |
| 1 | 4.9 | 3.0 | 1.4 | 0.2 | setosa |
| 2 | 4.6 | 3.1 | 1.5 | 0.2 | setosa |
| 3 | 5 | 3.6 | 1.4 | 0.2 | setosa |
| 4 | 5.4 | 3.9 | 1.8 | 0.4 | setosa |
| 5 | 4.6 | 3.4 | 1.4 | 0.3 | setosa |
| 6 | 5 | 3.4 | 1.5 | 0.2 | setosa |
| 7 | 4.4 | 2.9 | 1.4 | 0.2 | setosa |
| ⋮ | ⋮ | ⋮ | ⋮ | ⋮ | ⋮ |

| No | sepal_length | sepal_width | petal_length | petal_width | species |
|----|--------------|-------------|--------------|-------------|---------|
| 0  | 5.1          | 3.5         | 1.4          | 0.2         | setosa  |
| 1  | 4.9          | 3.0         | 1.4          | 0.2         | setosa  |
| 2  | 4.6          | 3.2         | 1.3          | 0.2         | setosa  |
| 3  | 4.6          | 3.1         | 1.5          | 0.2         | setosa  |
| 4  | 5.0          | 3.6         | 1.4          | 0.2         | setosa  |
| 5  | 5.4          | 3.9         | 1.8          | 0.4         | setosa  |
| 6  | 4.6          | 3.4         | 1.4          | 0.3         | setosa  |
| 7  | 5.0          | 3.4         | 1.5          | 0.2         | setosa  |
| ⋮  | ⋮            | ⋮           | ⋮            | ⋮           | ⋮       |

METHOD AND APPARATUS FOR CORRECTING MISSING VALUE IN DATA

This application claims priority to Korean Patent Application No. 10-2018-0109019, filed on Sep. 12, 2018, and all the benefits accruing therefrom under 35 U.S.C. § 119, the disclosure of which is incorporated herein by reference in its entirety.

BACKGROUND

1. Field

The present disclosure relates to a method and apparatus for correcting missing values in data for the analysis of the data, and more particularly, to a method and apparatus for correcting missing values with similar values to data that has actually been generated through machine learning.

2. Description of the Related Art

As the collection of data has been facilitated through the web, mobile terminals, Internet-of-Things (IoT) sensors, and the like, data analysis has been performed on a variety of data. However, in the process of collecting data, missing values, which are values that fail to be collected for some reasons, may be included in the collected data.

If the collected data contains missing values, data sets including the missing values are deleted, and then, only a smaller amount of data than the original collected data is subjected to data analysis. This, however, reduces the total amount of data that data analysis is based on, which in turn lowers the test power in terms of statistics.

Therefore, a method is needed to correct missing data. To this end, a method may be used in which missing data is replaced with average data or most frequent data. Alternatively, the statistical program R provides packages for correcting missing data, such as Amelia, Mice, and Mistools, but machine learning algorithms that support such packages are limited. That is, since missing data is corrected using only a small number of models, the accuracy of the correction is not high.

SUMMARY

Embodiments of the present disclosure provide an apparatus and method for precisely predicting and correcting missing values by using a model obtained by selecting variables from data and applying a machine learning algorithm to the variables to learn the data.

Embodiments of the present disclosure also provide an apparatus and method for automatically correcting missing values.

Embodiments of the present disclosure also provide an apparatus and method for precisely predicting the actual value for missing values through an appropriate amount of computation.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an embodiment of the present disclosure, a method of correcting missing values in basic data is provided. The method comprises, a data extraction step of extracting integrity data, which consists of a set of rows that do not include missing values, from the basic data, extracting first label data, which consists of data of a column of the integrity data that includes the missing value, from the integrity data, and extracting first feature data from data of a column of the integrity data that is for correcting the missing value, a prediction model configuration step of configuring a first prediction model for predicting the missing value, a first correction step of generating corrected data having the missing value corrected with a first predicted value obtained by inputting a feature extracted from the data of the column for correcting the missing value, among data of a row of the basic data where the missing value exists, to the first prediction model, and a second correction step of determining a second prediction model for correcting the first predicted value based on the corrected data and correcting the first predicted value with a second predicted value by using the second prediction model.

According to the aforementioned and other embodiments of the present disclosure, an apparatus for correcting missing values is provided. The apparatus comprises a processor and a memory storing at least one program executed by the processor. The at least one program includes instructions for performing operations of: extracting integrity data, which consists of a set of rows that do not include missing values, from the basic data; extracting label data, which consists of data of a column of the integrity data that includes the missing value, from the integrity data and extracting first feature data from data of a column of the integrity data that is for correcting the missing value; calculating, based on the label data and the first feature data, evaluation values of a plurality of candidate prediction models that differ in at least one of a machine learning algorithm and a parameter and selecting the first prediction model from among the candidate prediction models based on the calculated evaluation values; generating corrected data having the missing value corrected with a first predicted value obtained by inputting data of the column for correcting the missing value, among data of a row of the basic data where the missing value exists; and determining a second prediction model for correcting the first predicted value based on the corrected data and correcting the first predicted value with a second predicted value by using the second prediction model.

According to the aforementioned and another embodiments of the present disclosure, a computer program for correcting missing values in basic data, stored in a computer-readable recording medium, is provided. The computer program executes, a data extraction step of extracting integrity data, which consists of a set of rows that do not include missing values, from the basic data, extracting first label data, which consists of data of a column of the integrity data that includes the missing value, from the integrity data, and extracting first feature data from data of a column of the integrity data that is for correcting the missing value, a prediction model configuration step of configuring a first prediction model for predicting the missing value, a first correction step of generating corrected data having the missing value corrected with a first predicted value which is obtained by inputting a feature extracted from data of the column for correcting the missing value, among data of a row of the basic data where the missing value exists, to the first prediction model, and a second correction step of determining a second prediction model for correcting the first predicted value based on the corrected data and correcting the first predicted value with a second predicted value by using the second prediction model.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which:

FIGS. 5 through 8 are schematic views illustrating about first correction of missing values according to some embodiments of the present disclosure;

FIG. 10 is a schematic view illustrating label data and feature data used to the second correction;

FIG. 15 is a schematic view illustrating how to determine a prediction model for each column of corrected data.

DETAILED DESCRIPTION

Embodiments of the present disclosure will hereinafter be described with reference to the accompanying drawings. The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Figure 1:
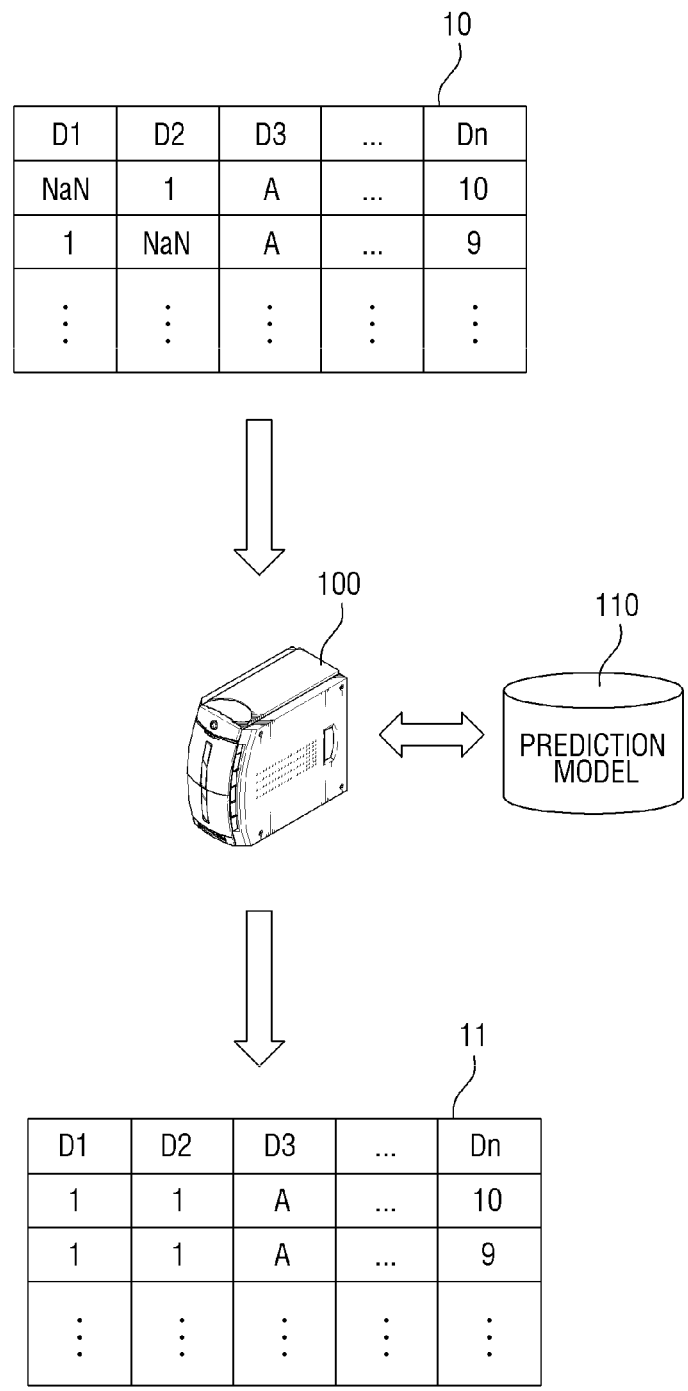
FIG. 1 is a schematic view illustrating data input to, and output from, an apparatus for correcting missing values according to some embodiments of the present disclosure.

FIG. 1 is a schematic view illustrating data input to, and output from, an apparatus for correcting missing values according to some embodiments of the present disclosure.

An apparatus 100 for correcting missing values according to some embodiments of the present disclosure may be a computing device receiving basic data 10 and outputting corrected data 11 obtained by correcting missing values in the basic data 10 with a value predicted by a prediction model 110. The computing device may be implemented as a notebook computer, a desktop computer, a laptop computer, a mobile terminal, a tablet personal computer (PC), or the like, but the present disclosure is not limited thereto. That is, nearly any type of device equipped with a computing function may be provided as the computing device. If the apparatus 100 is for correcting any missing values in large-size data, the apparatus 100 may preferably be implemented as a high-performance server computing device.

The apparatus 100 may generate the prediction model 110 by learning the basic data 10. The apparatus 100 may predict the actual value for the missing value using the prediction model 110. For example, the apparatus 100 may generate the prediction model 110 by learning rows of the basic data 10 where the missing value does not exist, and may predict the actual value for the missing value by inputting entire data of a row of the basic data 10 where the missing value exists, except for the missing value, to the prediction model 110. Alternatively, separate apparatuses may be configured to generate the prediction model 110 and to correct the missing value with the prediction model 110. For example, the apparatus configured to generate the prediction model 110 may generate and distribute the prediction module 110, and the apparatus configured to correct the missing value using the prediction model 110 may correct the missing value with the prediction model 110.

For convenience, the apparatus 100 will hereinafter be described as generating the prediction model 110 and correcting the missing value using the prediction model 110.

Figure 2:
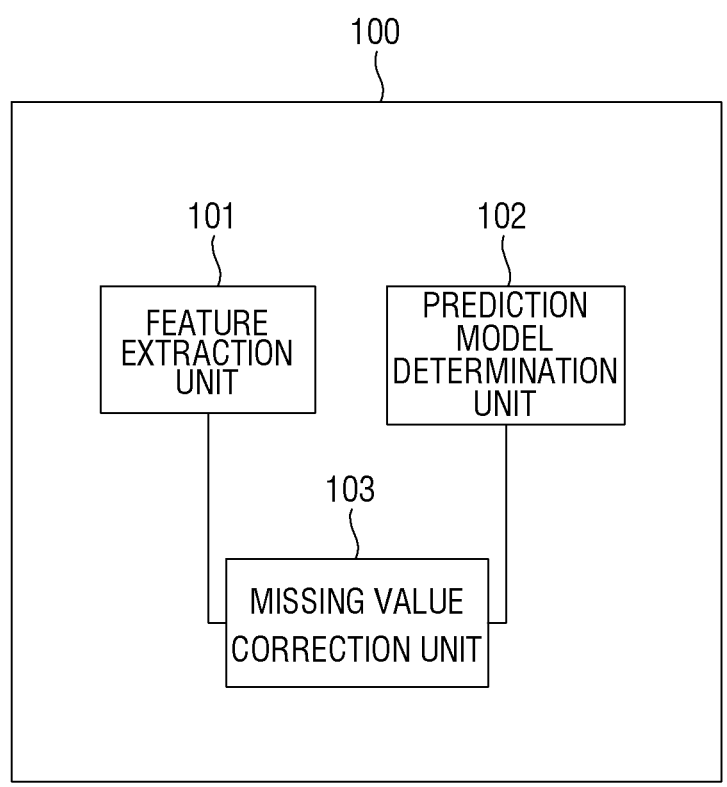
FIG. 2 is a block diagram illustrating the apparatus for correcting missing values according to some embodiments of the present disclosure.

FIG. 2 is a block diagram illustrating the apparatus for correcting missing values according to some embodiments of the present disclosure.

The apparatus 100 may include a feature extraction unit 101, a prediction model determination unit 102, and missing value correction unit 103. FIG. 2 illustrates only the elements associated with the concept of the present disclosure, and obviously, the apparatus 100 may further include various general-purpose elements in addition to the elements illustrated in FIG. 2. The elements illustrated in FIG. 2 are functionally-defined elements, and at least one of the elements illustrated in FIG. 2 may be incorporated into a single element in an actual physical environment or may be implemented by a combination of various other elements.

The feature extraction unit 101 may select learning data, which is to be used in learning, from the basic data 10 and may determine, from the learning data, feature data, which is target data to be learned, and label data for the feature data. Since it is difficult to use data with missing values as the feature data or as the label data, the learning data may be configured not to include any missing value.

The prediction model determination unit 102 may generate the prediction model 110, which is for predicting the actual value for missing values, as a result of learning from the learning data provided by the feature extraction unit 101.

Here, the prediction model determination unit 102 may generate a plurality of candidate prediction models, may evaluate the candidate prediction models, and may select one of the candidate prediction models as the prediction model 110.

The missing value correction unit 103 may correct missing values with a predicted value obtained using the prediction model 110 provided by the prediction model determination unit 102 and may output resulting corrected data. The apparatus 100 may repeat configuring learning data via the feature extraction unit 101 and correcting a previously determined predicted value via the missing value correction unit 103, using a prediction model determined by the prediction model determination unit 102. As the apparatus 100 continues to revise the predicted value for corrected data, the reliability of the correction of the missing value can be improved.

The elements illustrated in FIG. 2 may be, but are not limited to, software elements or hardware elements such as field programmable gate arrays (FPGAs) or application-specific integrated circuits (ASICs). The elements illustrated in FIG. 2 may be configured in an addressable storage medium and may be for executing one or more processors. The functions provided by the elements illustrated in FIG. 2 may be implemented by further subdivided elements or by a single element obtained by combining multiple elements.

Figure 3:
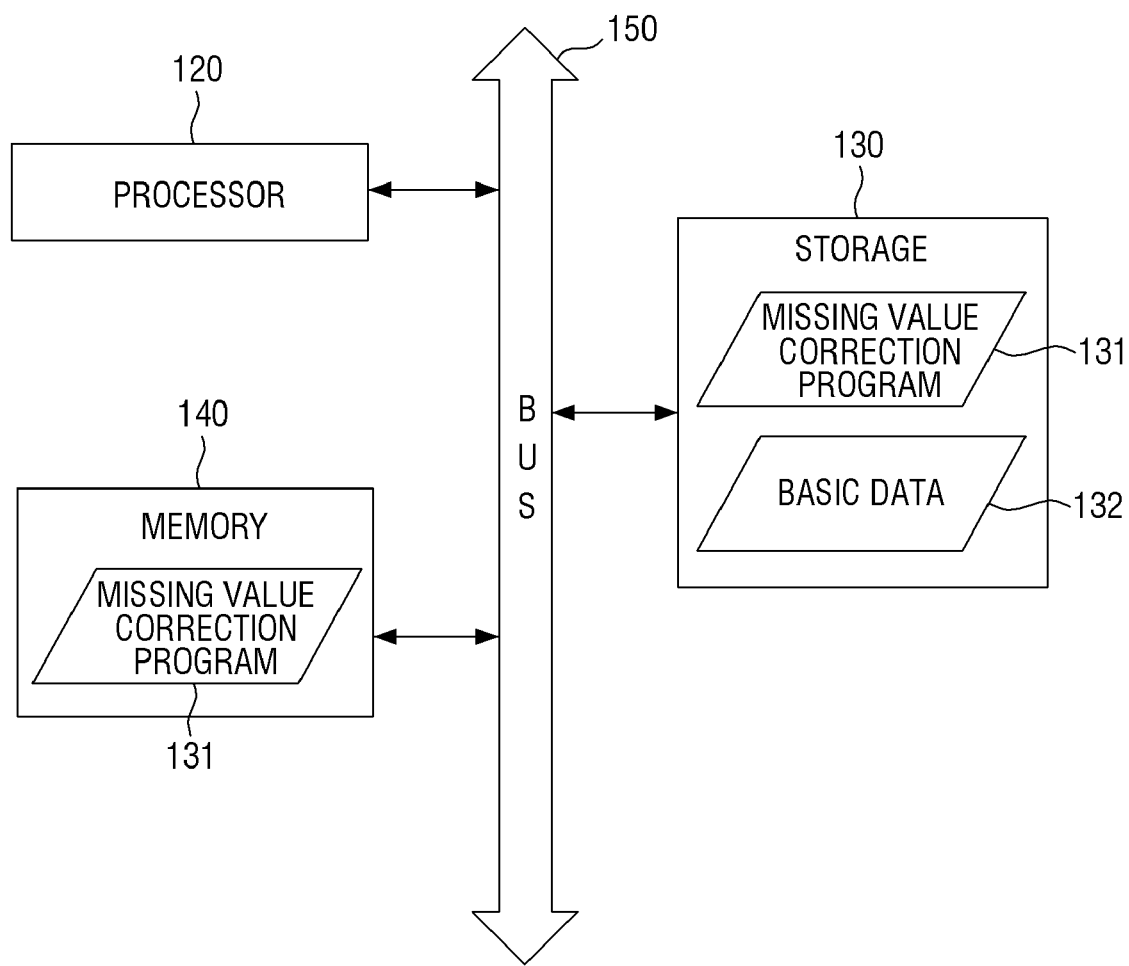
FIG. 3 is a view illustrating the hardware configuration of the apparatus for correcting missing values according to some embodiments of the present disclosure.

FIG. 3 is a view illustrating the hardware configuration of the apparatus for correcting missing values according to some embodiments of the present disclosure.

Referring to FIG. 3, the apparatus 100 may include at least one processor 120, a bus 150, a memory 140 which loads a computer program executed by the processor 120, and a storage 130 which stores missing values correction program 131.

The processor 120 may control the general operation of each of the elements of the apparatus 100. The processor 120 may be configured to include a central processing unit (CPU), a micro-processing unit (MPU), a micro-controller unit (MCU), a graphic processing unit (GPU), or another well-known arbitrary processor. The processor 120 may compute at least one application or program for executing a method of correcting missing values according to some embodiments of the present disclosure.

The memory 140 may store various data, instructions, or information. The memory 140 may load at least one program 131 from the storage 130 to perform the method of correcting missing values according to some embodiments of the present disclosure. For example, the memory 140 may include a random-access memory (RAM).

The bus 150 may provide communication between the elements of the apparatus 100. The bus 150 may be implemented as an address bus, a data bus, a control bus, or the like.

The storage 130 may non-temporarily store the program 131 and basic data 132, which is target data to be analyzed. The storage 130 may include a non-volatile memory such as a read-only memory (ROM), an erasable programmable ROM (EPROM), an electrically erasable programmable ROM (EEPROM), or a flash memory, a hard disk, a removable disk, a solid state disk (SSD), or another well-known arbitrary computer-readable recording medium.

The missing value correction program 131 may include operations that can be loaded in the memory 140 to perform the method of correcting missing values according to some embodiments of the present disclosure.

For example, the missing value correction program 131 may include operations of: extracting integrity data consisting of a set of rows with no missing value from the basic data 132; selecting, from the integrity data, label data consisting of data of a column of the integrity data that corresponds to the missing value being corrected, and feature data including one or more columns of the integrity data that is for correcting the missing value; calculating the evaluation values of a plurality of candidate prediction models for the label data and the feature data; generating corrected data having the missing value corrected by inputting data to a prediction model selected from among the candidate prediction models based on the evaluation values of the candidate prediction models, and repeatedly correcting the corrected data.

Figure 4:
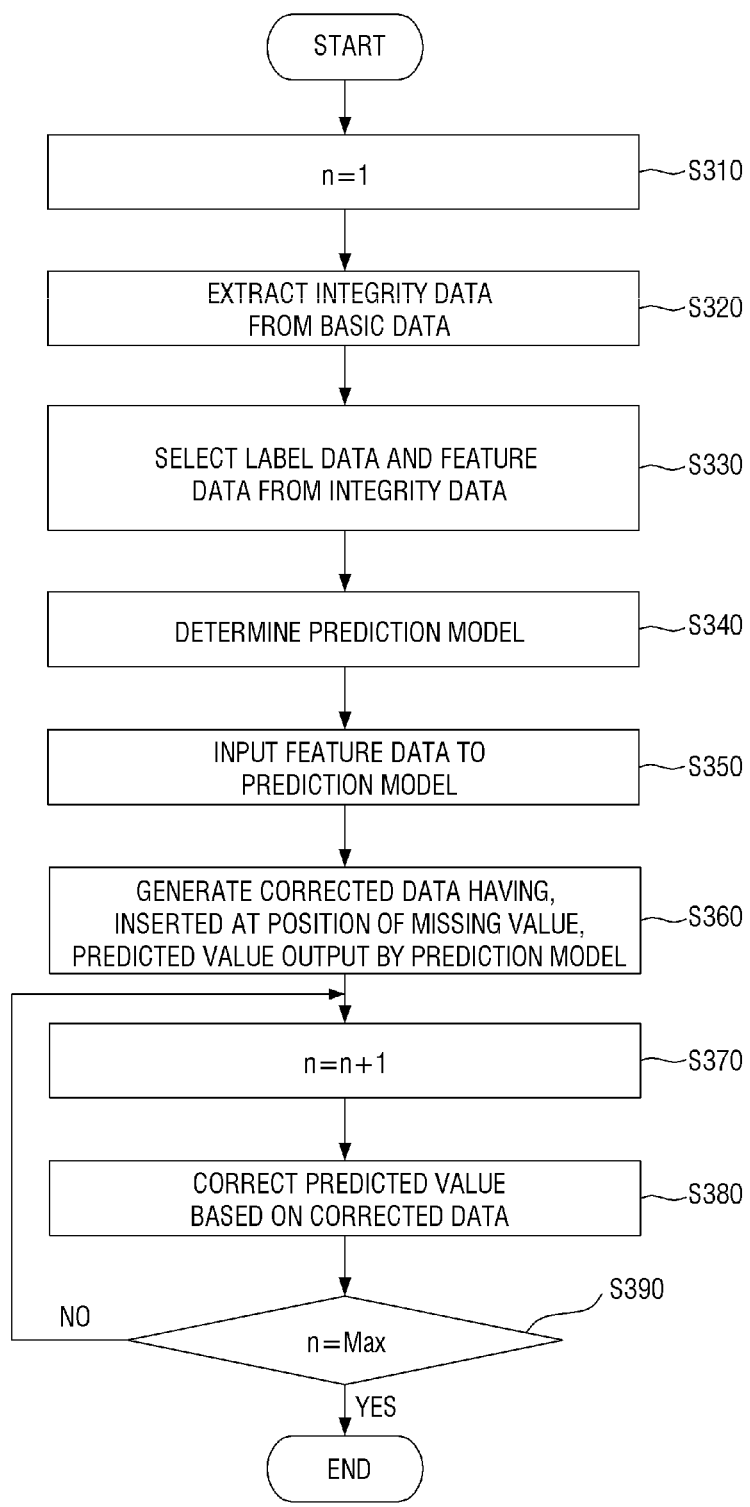
FIG. 4 is a flowchart illustrating how to correct missing values according to some embodiments of the present disclosure.

FIG. 4 is a flowchart illustrating how to correct missing values according to some embodiments of the present disclosure. The embodiment of FIG. 4 is only exemplary, and the order in which processes illustrated in FIG. 4 are performed may vary.

Referring to FIG. 4, in S310, the apparatus 100 may initialize a correction count n which indicates the number of iterations that basic data has been corrected for any missing value.

Thereafter, in S320, the apparatus 100 may extract integrity data from the basic data. The integrity data refers to data consisting of rows with no missing value.

FIG. 5 illustrates exemplary basic data 500. Referring to FIG. 5, the apparatus 100 may remove data of rows 520 where missing values exists from the basic data 500 to configure integrity data.

Figure 6:
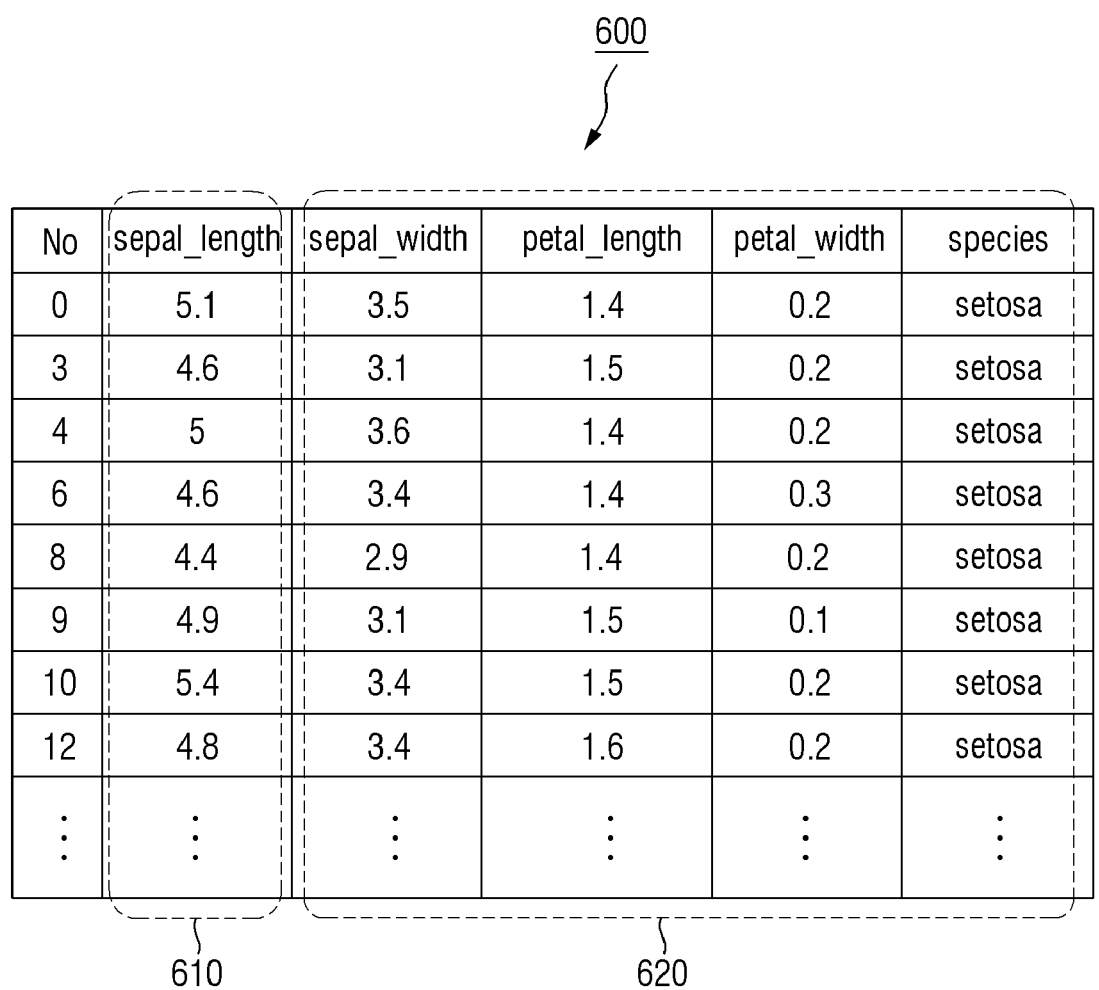

FIG. 6 illustrates exemplary integrity data 600 configured from the basic data 500 of FIG. 5. Referring to FIG. 6, the apparatus 100 may configure the integrity data 600 by excluding the rows 520 of the basic data 500 that include or correspond to a missing value. For example, referring to FIG. 5, if the basic data 500 consists of a total of 150 rows and there are 30 rows 520 that include a missing value, the integrity data 600 may consist of a total of 120 rows.

Thereafter, in S330, the apparatus 100 may determine label data and feature data, which are to be used to correct the missing value, based on the integrity data.

Specifically, referring to FIGS. 5 and 6, in order to correct missing values 510 in the basic data 500, the apparatus 100 may determine a column of the integrity data 600 that the missing value 510 belongs (i.e. corresponds) to, i.e., a "sepal_length" column 610, as label data. Also, the apparatus 100 may determine feature data from data of other columns 620 of the integrity data 600 for correcting the missing value 510.

In some embodiments, the apparatus 100 may determine data of all the columns 620 as the feature data. In other embodiments, since the columns 620 may include data that is hardly related to the actual value for the missing value, the apparatus 100 may determine data of only some of the columns 620 as the feature data. In yet other embodiments, the apparatus 100 may extract the feature data based on data variations by conducting principal component analysis (PCA) on the label data, i.e., data that belongs to the "sepal_length" column 610, among the data of the columns 620, and m principal component variables with largest data variations may be chosen from among principal component variables generated by the PCA.

Thereafter, in S340, the apparatus 100 may determine a prediction model. In some embodiments, the apparatus 100 may generate a plurality of candidate prediction models by learning the feature data and the label data determined in S330 through a plurality of machine learning algorithms included therein and then may select one of the candidate prediction models as the prediction model. Here, the apparatus 100 may generate the candidate prediction models by changing machine learning algorithms and/or parameters whenever performing learning. In other embodiments, the apparatus 100 may generate the candidate prediction models based on a machine learning algorithm and a parameter set in advance by a user.

A prediction model generated for one missing value may not be used to predict the actual value for another missing value. In a case where there exist multiple missing values belonging to different columns or multiple missing values in the same row, feature data used to predict the actual value for one missing value may differ from feature data used to predict the actual value for another missing value. For example, as illustrated in FIG. 5, if the actual value for missing value 531 is predicted using the prediction model used to predict the actual value of the missing value 510, feature data may not be properly extracted because there exists another missing value 532 in the same row as the missing value 531.

Figure 7:
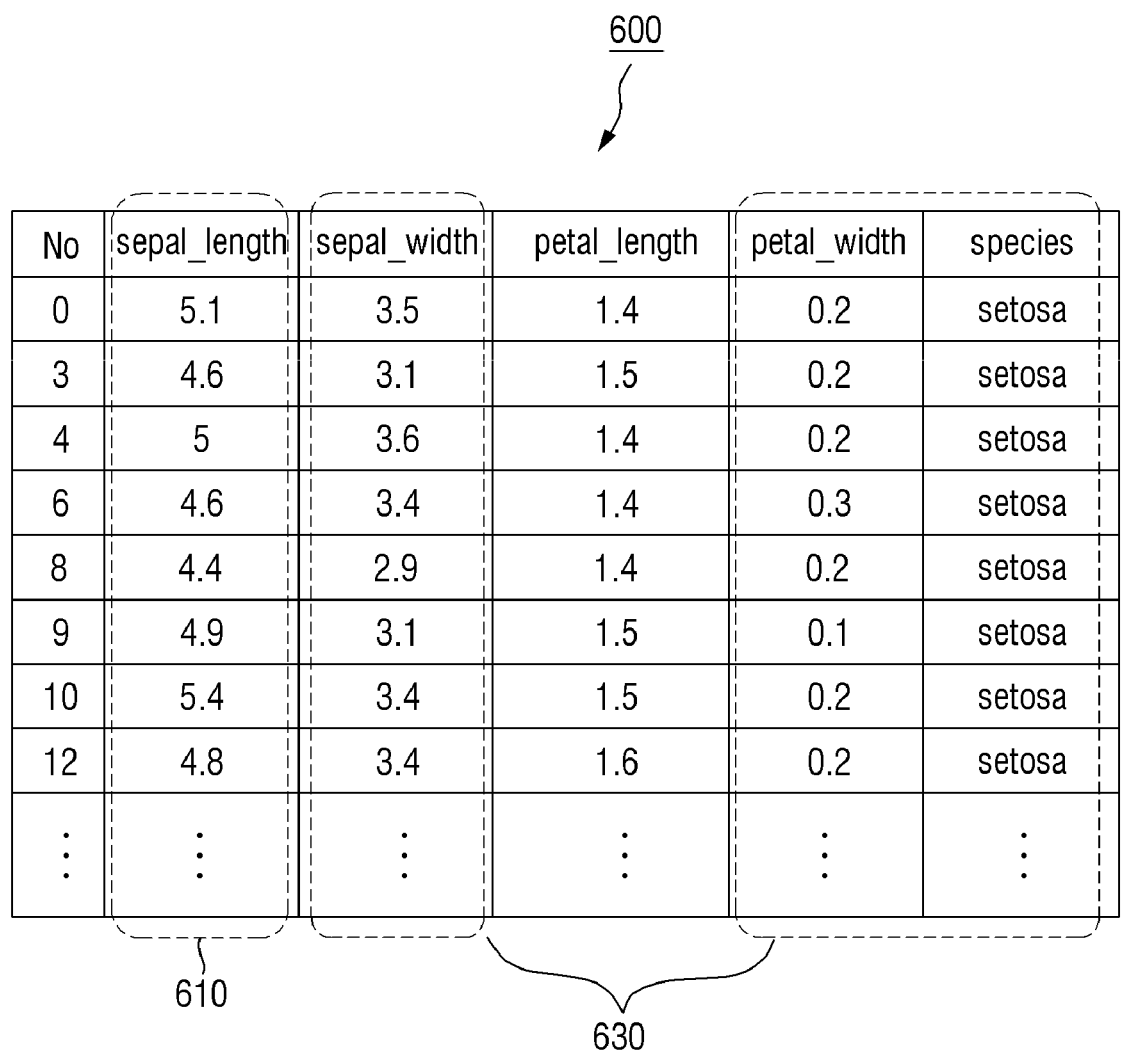

Thus, in S330 and S340, the apparatus 100 needs to configure label data and feature data for each missing value included in the basic data and to configure a prediction model for each missing value. Specifically, referring to FIGS. 5 and 7, in S330, the apparatus 100 configures the "sepal_length" column 610 as label data for the missing value 531, may configure feature data from data of columns 620 where neither the missing value 531 nor the missing value 532 corresponds to, and may determine a prediction model for correcting the missing value 531 based on the label data and the feature data.

Thereafter, in S350, the apparatus 100 may input the feature data extracted from the data of the row 520 where the missing value exists to the prediction model determined in S340. Thereafter, in S360, the apparatus 100 may generate corrected data by inserting, at the position of the missing value in the basic data, a predicted value output by the prediction model.

FIG. 8 illustrates exemplary corrected data 800 which is generated as a result of S360. Referring to FIGS. 5 and 8, the apparatus 100 in S350 may input feature data extracted from the row 520 where the missing value 510 of FIG. 5 exists into the prediction model determined in S340. For example, the apparatus 100 may input all values included in the row 520 (i.e., 3.2, 1.3, 0.2 and "setosa"), with the exception of the missing value that belongs to the "sepal_length" column, into the prediction model determined in S340. If the prediction model in S340 returns a value of 4.6 as a predicted value 810, the apparatus 100 may generate the corrected data 800 by inserting the predicted value 810 at the position of the missing value 510.

Thereafter, in S370, the apparatus 100 raises the correction count n by 1. In S380, the apparatus may revise the corrected data by correcting the predicted value inserted in the correction data generated in S360.

In S380, the apparatus 100 may correct the predicted value in a similar manner to that used to determine the missing value in the basic data in S320 and S330. In some embodiments, in S380, the apparatus 100 may configure new label data and new feature data for correcting the predicted value and may then generate a new prediction model based on the new label data and the new feature data to correct the predicted value.

Thereafter, in S390, if the correction count n is not at its maximum, S370 may be performed again. On the contrary, if the correction count n is at its maximum, the determination of the missing value is completed. S390 is for repeating S380 a predetermined number of times and may vary.

Figure 9:
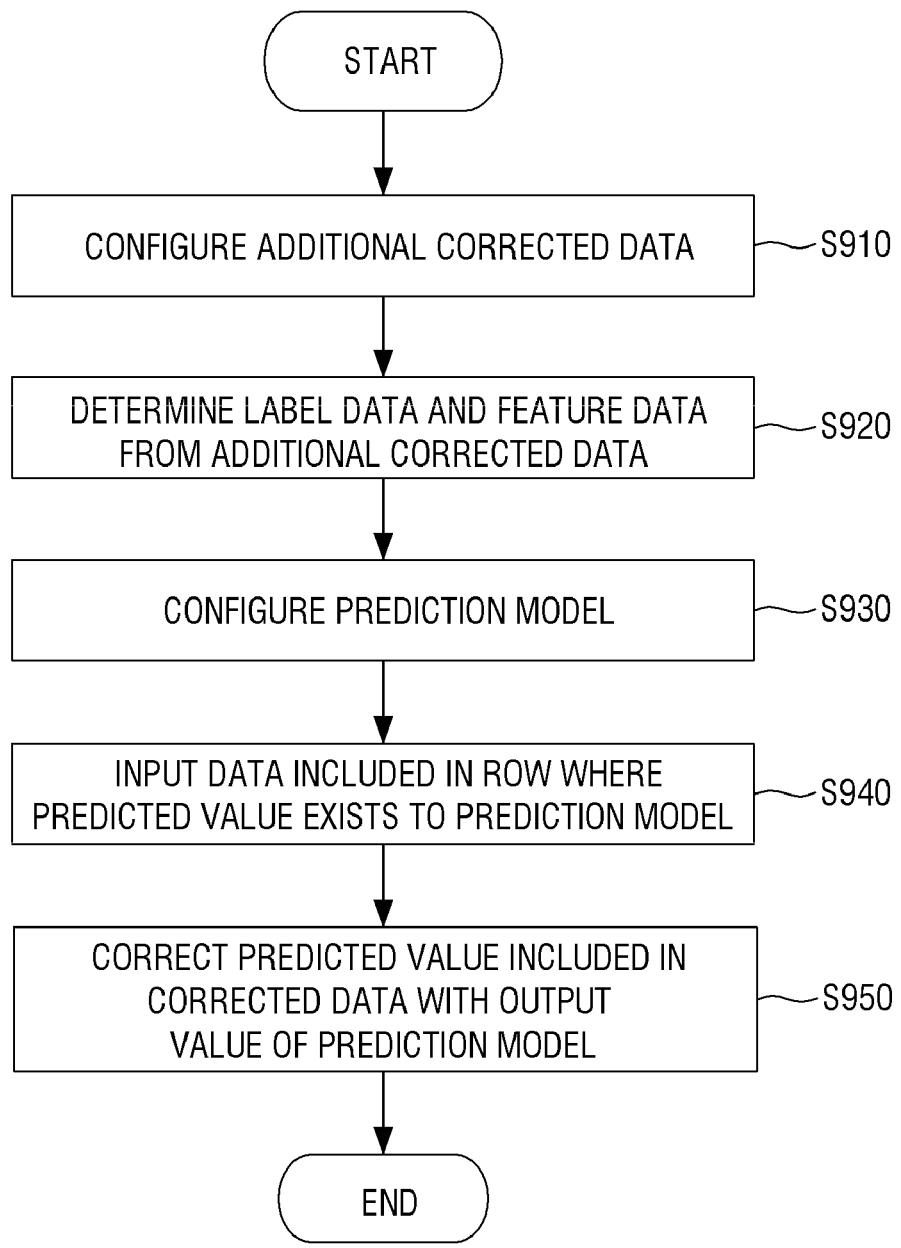
FIG. 9 is a flowchart illustrating about second correction of a predicted value according to some embodiments of the present disclosure, which may be performed after the first correction of the missing value.

FIG. 9 is a flowchart illustrating a second round or iteration of a predicted value according to some embodiments of the present disclosure, which may be performed after the first iteration of correcting the missing value S320 to S360 of FIG. 4. Processes illustrated in FIG. 9 may be performed in S380 of FIG. 4.

Referring now to FIG. 9, in S910, the apparatus 100 may configure additional corrected data (analogous to the integrity data produced in the first iteration of n=1) based on the corrected data to configure a new prediction model. In S320 of FIG. 4, which is for extracting integrity data to correct basic data for the first time, data of all rows of the basic data where missing values exists is excluded because the missing value may exist in more than one row of the basic data. However, since the corrected data is data having the missing value replaced with a predicted value, the apparatus 100 may configure the additional corrected data simply by excluding rows where the predicted value exists from the corrected data.

Specifically, referring to FIGS. 8 and 10, in order to correct the predicted value 810 inserted in the corrected data 800, the apparatus 100 may configure additional corrected data 1000 by excluding the data of the row 820 where the predicted value 810 exists from the corrected data 800. For example, if the corrected data 800 consists of 150 rows, the additional corrected data 100 may consist of 149 rows.

Thereafter, in S920, the apparatus 100 may determine label data and feature data from the additional corrected data. Specifically, referring to FIGS. 8 and 10, in order to correct the predicted value inserted in the corrected data 800, the apparatus 100 may determine data of a column 1010 that corresponds to the predicted value 810 as label data and may determine feature data from data of other columns 1020.

Thereafter, in S930, the apparatus 100 may configure a prediction model based on the label data and the feature data determined in S920. In some embodiments, the apparatus 100 may generate a plurality of candidate prediction models by learning the feature data and the label data determined in S920 through the machine learning algorithms included therein and may select one of the candidate prediction models as the prediction model. Here, the apparatus 100 may generate the candidate prediction models by changing machine learning algorithms and/or parameters whenever performing learning. In other embodiments, the apparatus 100 may generate the prediction models based on a machine learning algorithm and a parameter set in advance by the user.

In yet other embodiments, in S910, S920, and S930, the apparatus 100 may generate additional corrected data by excluding all rows where the predicted value exists from the corrected data, may generate a prediction model for each column of the corrected data where the predicted value exists by learning the additional corrected data, and may select the prediction model generated for each column of the corrected data where the predicted value exists.

Thereafter, in S940, the apparatus 100 may input data of each of the rows where the predicted value exists into the prediction model configured in S930. For example, referring to FIG. 8, the apparatus 100 may input feature data extracted from the row 820 of the corrected data 800 where the predicted value 810 exists into the prediction model configured in S930.

Thereafter, in S950, the apparatus 100 may generate new corrected data by correcting the predicted value included in the corrected data with an output value returned by the prediction model configured in S930. For example, the apparatus 100 may replace the predicted value included in the corrected data with the output value returned by the prediction model configured in S930.

Figure 11:
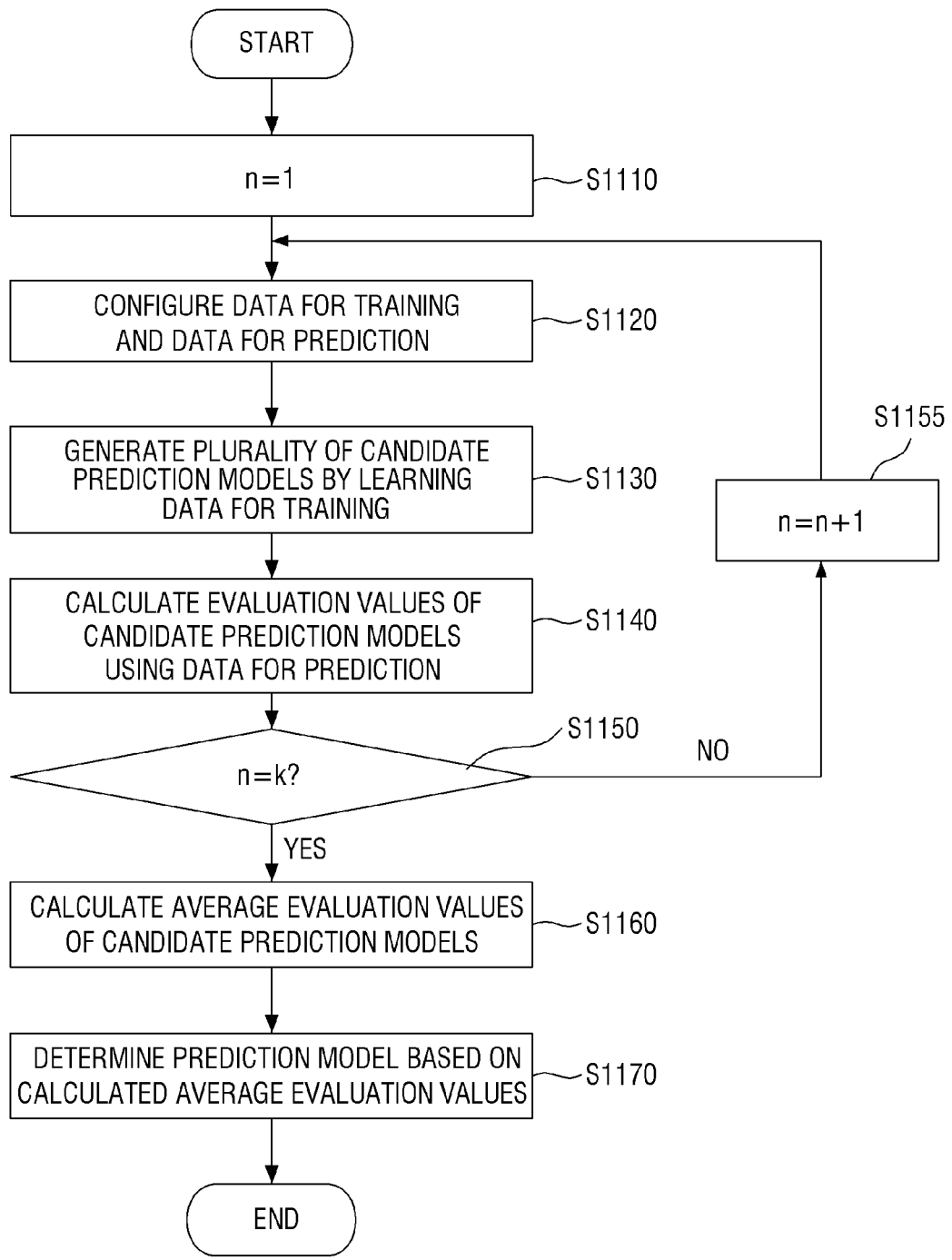
FIG. 11 is a flowchart illustrating how to automatically choose a prediction model for use in the correction of missing values according to some embodiments of the present disclosure.

FIG. 11 is a flowchart illustrating how to automatically choose a prediction model for use in the correction of missing values according to some embodiments of the present disclosure. Processes illustrated in FIG. 11 may be performed in S340 or S380 of FIG. 4 or in S930 of FIG. 9.

Referring now to FIG. 11, in S1110, the apparatus 100 may initialize an evaluation count n. Thereafter, in S1120, the apparatus 100 may configure data for training and data for prediction. For example, in S340 of FIG. 4, in order to correct missing values based on basic data, the apparatus 100 may divide integrity data configured from the basic data into the data for training and the data for prediction. Likewise, in S380 of FIG. 4, in order to correct a predicted value based on corrected data, the apparatus 100 may divide additional corrected data into the data for training and the data for prediction. Here, the data for training refers to target data to be learned to generate a prediction model through a machine learning algorithm, and the data for prediction refers to data for evaluating each candidate prediction model.

The apparatus 100 may configure the data for training and the data for prediction based on the value of k where k denotes the number of iterations of the evaluation of candidate prediction models. The apparatus 100 may divide data into k partial data. The apparatus 100 may use n-th partial data as the data for prediction and may use the other partial data as the data for training. In some embodiments, k may be set to 4 or greater.

Figure 12:
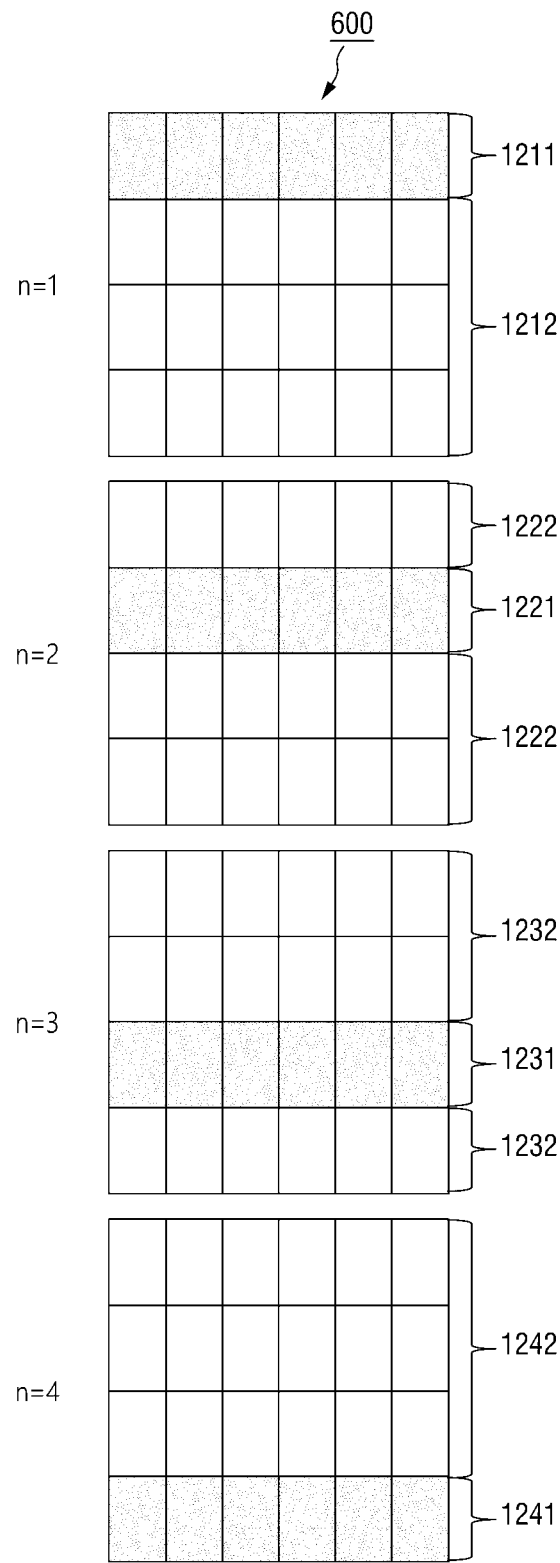
FIG. 12 is a schematic view illustrating how to divide data into data for training and data for prediction according to some embodiments of the present disclosure.

For example, referring to FIG. 12, if the integrity data 600 consists of four rows and k=4, the apparatus 100 may use data of a first row 1211 as the data for prediction and data of other rows 1212 as the data for training when n=1; may use data of a second row 1221 as the data for prediction and use data of other rows 1222 as the data for training when n=2; may use data of a third row 1231 as the data for prediction and use data of other rows 1232 as the data for training when n=3; and may use data of a fourth row 1241 as the data for prediction and use data of other rows 1242 as the data for training when n=4. This example may be directly or similarly applicable to how to correct a predicted value in corrected data to produce additional corrected data in S380 of FIG. 4.

The division of particular data into k partial data may be performed in various manners. For example, when n=1, the apparatus 100 may configure the data for prediction using a set of rows of the particular data corresponding to multiples of k and may configure the data for training using the rest of the particular data. Thereafter, whenever n is raised, the apparatus 100 may raise the numbers of rows to be included in the data for prediction by 1.

Thereafter, in S1130, the apparatus 100 may generate a plurality of candidate prediction models by learning the data for learning. The apparatus 100 may generate the candidate prediction models by changing machine learning algorithms and/or parameters whenever performing learning.

Thereafter, in S1140, the apparatus 100 may calculate the evaluation values of the candidate prediction models using the data for prediction. That is, the apparatus 100 may input feature data extracted from the data for prediction to each of the candidate prediction models and may calculate the evaluation value of each of the candidate prediction models based on whether an output value returned by the corresponding candidate prediction model matches label data of the data for prediction.

Thereafter, in S1150, a determination may be made as to whether the evaluation count n is the same as the value of k. In S1155, if the evaluation count n is not the same as the value of k, the apparatus 100 raises the evaluation count n by 1 and may perform S1120, S1130, and S1140 repeatedly. S1150 is for evaluating each of the candidate prediction models k times while changing data for training and data for prediction and may vary.

In S1160, if the evaluation count n is the same as the value of k, the apparatus 100 may calculate the average evaluation values of the candidate prediction models. Thereafter, in S1170, the apparatus 100 may determine one of the candidate prediction models as a prediction model for correcting missing values or a predicted value based on the average evaluation values of the candidate prediction models.

Figure 13:
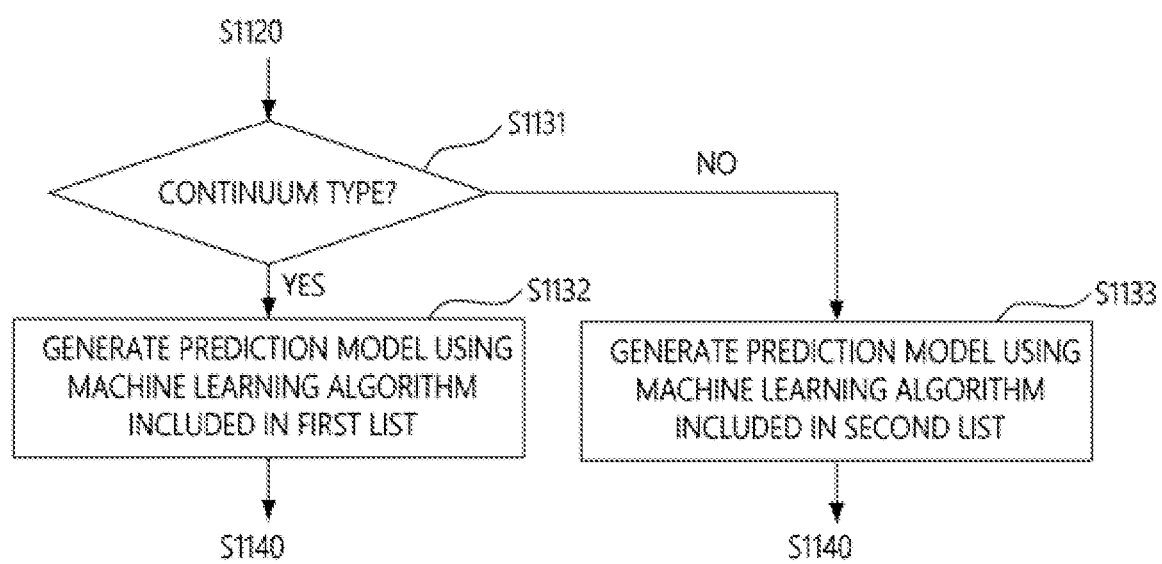
FIG. 13 is a flowchart illustrating how to generate a prediction model according to some embodiments of the present disclosure.

FIG. 13 is a flowchart illustrating how to generate a prediction model according to some embodiments of the present disclosure. Referring to FIG. 13, the apparatus 100 may determine a machine learning algorithm to be used in generating a prediction model based on the type of label data.

Specifically, integrity data or additional corrected data may be configured first, label data may be determined from the integrity data or the additional corrected data, and in S1131, the apparatus 100 may determine whether the label data is of a continuum type or a category type. If the label data is numeric data, the apparatus 100 may determine that the label data is of the continuum type. If the label data is character data, the apparatus 100 may determine that the label data is of the category type.

In S1132, if the label data is of the continuum type, the apparatus 100 may generate a prediction model using a machine learning algorithm that belongs to a first list. The first list may include the following machine learning algorithms: a linear regression algorithm, a decision tree algorithm, a random forest algorithm, and a gradient boosting algorithm.

In S1133, if the label data is of the category type, the apparatus 100 may generate a prediction model using a machine learning algorithm that belongs to a second list. The second list may include the following machine learning algorithms: a logistic regression algorithm, the decision tree algorithm, the random forest algorithm, the gradient boosting algorithm, and a multilayer perception algorithm.

Figure 14:
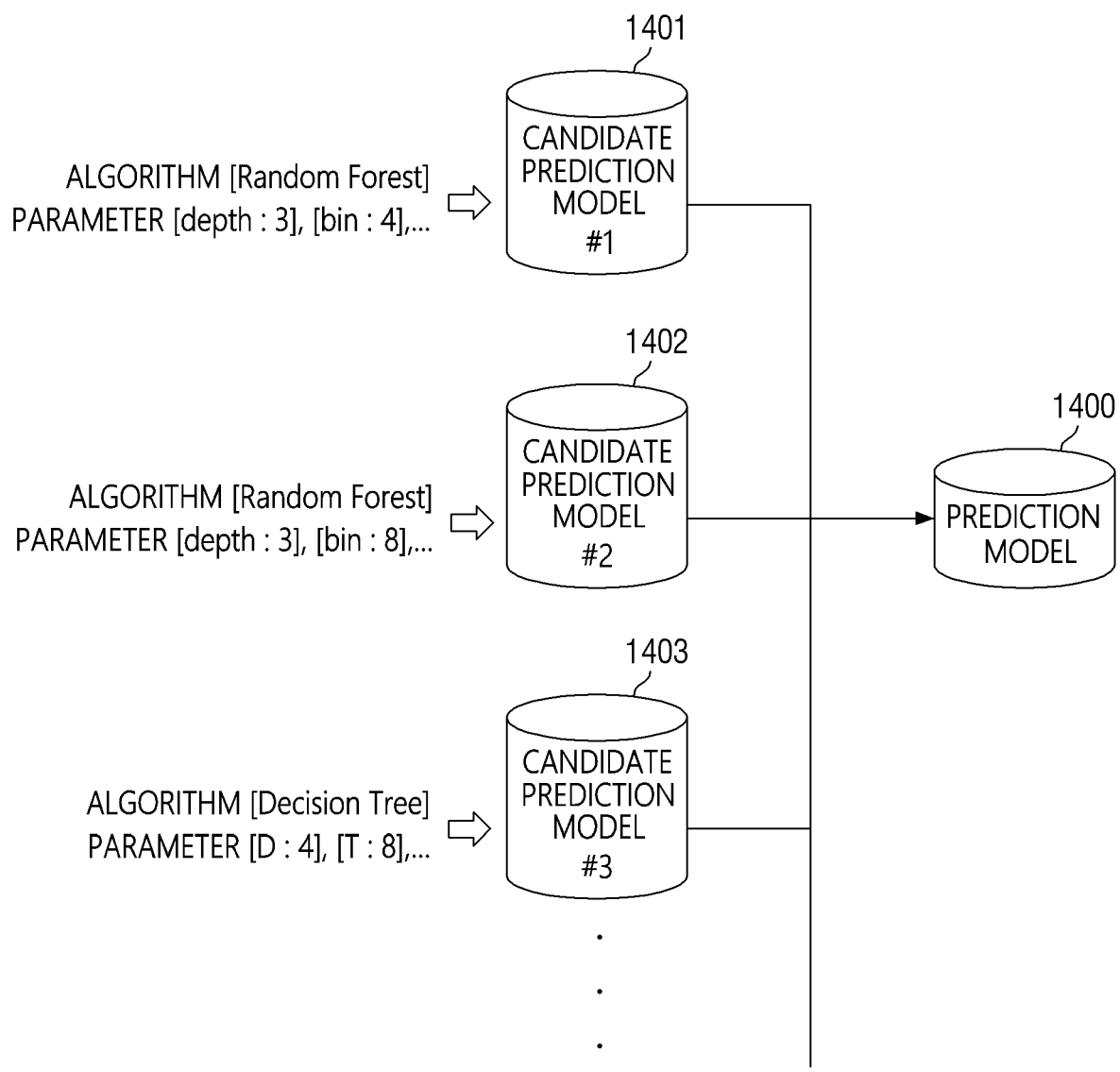
FIG. 14 is a schematic view illustrating how to select a prediction model according to some embodiments of the present disclosure.

FIG. 14 is a schematic view illustrating how to select a prediction model according to some embodiments of the present disclosure.

Referring to FIG. 14, the apparatus 100 may generate a candidate prediction model 1401 by setting a parameter, within a predetermined range, for one machine learning algorithm included in a predetermined list, e.g., the random forest algorithm, and learning data in accordance with the random forest algorithm. Also, the apparatus 100 may generate a candidate prediction model 1402 by changing parameters, within the predetermined range, for the random forest algorithm and learning data. After the generation of the candidate prediction models 1401 and 1402 for possible combinations of parameters within the predetermined range, the apparatus 100 may generate a candidate prediction model 1403 by setting a parameter for another machine learning algorithm included in the predetermined list, e.g., the decision tree algorithm, and learning data in accordance with the decision tree algorithm.

Once the candidate prediction models 1401, 1402, and 1403 are generated, the apparatus 100 may evaluate the candidate prediction models 1401, 1402, and 1403 and may determine a prediction model 1400 for correcting missing values or a predicted value.

FIG. 15 is a schematic view illustrating how to determine a prediction model for each column of corrected data.

In S380 of FIG. 4, in a third round of the correction of missing values or later, the apparatus 100 may generate a prediction model for each column of corrected data and may then correct a predicted value present in each column of the corrected data.

Specifically, the apparatus 100 may determine the locations of columns of corrected data 800 where predicted values 1501, 1502, 1503, and 1504, and 1505 have been inserted to replace missing values.

Thereafter, the apparatus 100 may configure additional corrected data by excluding rows where the predicted values 1501, 1502, 1503, and 1504, and 1505 exist from the corrected data 800. Thereafter, the apparatus 100 may determine prediction models for the columns where the prediction values 1501, 1502, 1503, and 1504, and 1505 exist. Thereafter, the apparatus 100 may correct the prediction values 1501, 1502, 1503, and 1504, and 1505 using the prediction models determined for the columns where the prediction values 1501, 1502, 1503, and 1504, and 1505 exist.

For example, in order to generate a prediction model for a "sepal_length" column 1510 of the corrected data 800, the apparatus 100 may determine data of the "sepal_length" column 1510 as label data and may extract feature data from other columns of the corrected data 800. Thereafter, the apparatus 100 may generate a prediction model by learning the label data and the feature data. Thereafter, the apparatus 100 may correct the predicted values 1501 and 1502 using the same prediction model, i.e., the prediction model generated for the "sepal_length" column 1510.

Methods according to the aforementioned exemplary embodiments of the present disclosure may be performed by executing computer programs, which are implemented as computer-readable codes. The computer programs may be transmitted from a first electronic device to a second electronic device via a network such as the Internet to be installed and used in the second electronic device. Examples of the first and second electronic devices include server devices, physical servers included in a server pool for providing a cloud service, and stationary electronic devices such as desktop PCs.

The computer programs may be stored in a non-transitory recording medium such as a digital versatile disc-read only memory (DVD-ROM) or a flash memory.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A method of correcting at least one of a plurality of missing values in a basic data set having a plurality of rows and columns, comprising:
    a data extraction step of extracting integrity data for the at least one missing value, the integrity data including a set of the rows of the basic data set that do not correspond to any of the missing values;
    selecting a first label data, which includes data of a column of the integrity data that corresponds to the at least one missing value, from the integrity data;
    selecting a first feature data from at least another column of the integrity data;
    a prediction model configuration step of configuring a first prediction model, for predicting the at least one missing value, using the first label data and the first feature data;
    a first correction step of generating corrected data that includes a first predicted value in place of the at least one missing value, the first predicted value obtained by inputting data, except for the at least one missing value, of a row of the basic data corresponding to the at least one missing value, into the first prediction model; and
    a second correction step of producing a second predicted value by correcting the first predicted value by determining a second prediction model.

2. The method of claim 1, wherein the prediction model configuration step comprises:
    generating a plurality of candidate prediction models by varying machine learning algorithms and parameters when learning the first label data and the first feature data;
    calculating evaluation values for each of the plurality of candidate prediction models; and
    selecting a first prediction model from among the candidate prediction models based on the calculated evaluation values.

3. The method of claim 2, wherein the selecting of the first feature data includes all remaining columns of the integrity data, except for the first label data and data of columns corresponding to others of the missing values arranged in a same row as the at least one missing value.

4. The method of claim 2, wherein the second correction step comprises:
    an additional corrected data configuration step of configuring an additional corrected data by excluding data of a row where the first predicted value of the corrected data exists;
    a second label data determination step of determining a second label data, which includes data of a column of the additional corrected data that corresponds to the first predicted value;
    a second feature data determination step of determining a second feature data, from the additional corrected data, including data of other columns of the additional corrected data except for the second label data; and
    a second prediction model determination step of determining the second prediction model by evaluating a plurality of second candidate prediction models based on the second label data and the second feature data.

5. The method of claim 4, wherein the second prediction model determination step determines the second prediction model for each column of the additional corrected data corresponding to the at least one missing value.

6. The method of claim 5, wherein the second correction step further comprises determining a second prediction value using the second prediction model by inputting data of a row corresponding to the at least one missing value.

7. The method of claim 2, wherein the prediction model configuration step comprises:
    a candidate prediction model generation step of dividing the integrity data into k partial data and generating the candidate prediction models by learning data for training, which includes (k−1) partial data, through a machine learning algorithm; and a candidate prediction model evaluation step of evaluating the candidate prediction models using data for prediction, which includes the other partial data.

8. The method of claim 7, wherein k=4.

9. The method of claim 8, wherein
the data for prediction is data of rows of the integrity data that correspond to multiples of k, and
the data for training is the rest of the integrity data.

10. The method of claim 2, wherein:
the generating of the candidate prediction models uses machine learning algorithms included in a first list upon the first label data being of a continuum type; and
the generating of the candidate prediction models uses machine learning algorithms included in a second list upon the first label data being of a category type.

11. The method of claim 10, wherein:
the first list includes a linear regression algorithm, a decision tree algorithm, a random forest algorithm, and a gradient boosting algorithm, and
the second list includes a logistic regression algorithm, the decision tree algorithm, the random forest algorithm, the gradient boosting algorithm, and a multilayer perception algorithm.

12. The method of claim 1, wherein the first feature data is selected by performing principal component analysis on the first label data to extract the feature based on data variations.

13. An apparatus to correct one missing value of a plurality of missing values from a basic data set that comprises a plurality of rows and a plurality of columns, comprising:
a processor; and
a memory storing at least one program executed by the processor, wherein the at least one program includes instructions for performing operations of:
extracting an integrity data, that includes a set of rows of the basic data set that do not include any of the missing values, from a basic data set;
selecting a first label data, that includes data of a column that corresponds to the one missing value, from the integrity data;
selecting a first feature data, that includes data of at least one column that is for correcting the one missing value, from the integrity data;
generating a plurality of candidate prediction models by varying machine learning algorithms and parameters when learning the first label data and the first feature data;
calculating evaluation values for each of the plurality of candidate prediction models;
selecting a first prediction model from among the candidate prediction models based on the calculated evaluation values;
generating corrected data having the missing value corrected with a first predicted value by inputting data of a row of the basic data set corresponding to the one missing value into the first prediction model;
determining a second prediction model for correcting the first predicted value based on the corrected data; and
correcting the first predicted value with a second predicted value by using the second prediction model.

14. A computer program product to correct one of a plurality of missing values in a basic data set arranged in a plurality of rows and columns, stored in a non-transitory computer-readable recording medium, the computer program executing:
a data extraction step of extracting integrity data, which includes a set of rows of the basic data set that do not include any of the missing values, from the basic data set;
selecting a first label data, that includes data of a column of the integrity data that corresponds to the one missing value, from the integrity data;
selecting a first feature data, that includes at least one column of the integrity data that is for correcting the one missing value, from the integrity data;
a first prediction model configuration step of configuring a first prediction model for predicting the one missing value;
a first correction step of generating corrected data having the one missing value corrected with a first predicted value by inputting data of a row of the basic data corresponding to the one missing value into the first prediction model;
a second prediction model configuration step of determining a second prediction model for correcting the first predicted value based on the corrected data; and
correcting the first predicted value with a second predicted value by using the second prediction model.

* * * * *